(12) United States Patent
Ardisana, II et al.

(10) Patent No.: US 12,411,358 B2
(45) Date of Patent: *Sep. 9, 2025

(54) EYEWEAR DEVICE LENS RETENTION MECHANISM (71) Applicant: Snap Inc., Santa Monica, CA (US)

(72) Inventors: John Bernard Ardisana, II, Torrance, CA (US); Teodor Dabov, Los Angeles, CA (US); Mathias Andreas Hintermann, Playa Vista, CA (US); Douglas Wayne Moskowitz, Marina Del Rey, CA (US); Ashutosh Y. Shukla, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 426 days.

This patent is subject to a terminal disclaimer.

(21) Appl. No.: 17/113,960

(22) Filed: Dec. 7, 2020

(65) Prior Publication Data
US 2021/0294120 A1 Sep. 23, 2021

Related U.S. Application Data (63) Continuation of application No. 16/256,681, filed on Jan. 24, 2019, now Pat. No. 10,877,293.
(Continued)

(51) Int. Cl.
G02C 5/00 (2006.01)
G02C 11/00 (2006.01)
G02C 13/00 (2006.01)

(52) U.S. Cl.
CPC .............. *G02C 5/001* (2013.01); *G02C 11/10* (2013.01); *G02C 13/001* (2013.01); *G02C 2200/06* (2013.01)

(58) Field of Classification Search
CPC ............ G02C 2200/06; G02C 2200/08; G02C 2200/10; G02C 1/08
(Continued)

(56) References Cited

U.S. PATENT DOCUMENTS 1,306,527 A * 6/1919 Day ........................ G02C 1/06
351/99
1,317,131 A * 9/1919 Herrick .................... G02C 1/06
351/150

(Continued)

FOREIGN PATENT DOCUMENTS

CN 101465477 6/2009
CN 101965663 2/2011
(Continued)

OTHER PUBLICATIONS

"International Application Serial No. PCT/US2019/015034, International Search Report mailed Jul. 18, 2019", 5 pgs.
(Continued)

Primary Examiner — Zachary W Wilkes
(74) Attorney, Agent, or Firm — SCHWEGMAN LUNDBERG & WOESSNER, P.A.

(57) ABSTRACT

An eyewear device has a lens retention mechanism that establishes electrical contact between onboard electronics and a lens ring by a resiliently compressible electrical contact member, such as a spring washer, located within a housing defined by a body of the eyewear device. The retention mechanism can further include a lock screw that is selectively engageable with the lens ring to allow disposal between retention and release of a lens by the lens ring, the lock ring being captured in the housing such as to resist removal of the lock screw from the housing when the lens ring is released for lens removal.

15 Claims, 9 Drawing Sheets

Related U.S. Application Data (60) Provisional application No. 62/621,482, filed on Jan. 24, 2018.

(58) Field of Classification Search
USPC .......... 351/86, 92, 95–96, 106, 158; 349/13
See application file for complete search history.

(56) References Cited

U.S. PATENT DOCUMENTS

| | | | | |
|---|---|---|---|---|
| 3,609,018 | A * | 9/1971 | Marolla | G02C 1/08 |
| | | | | 351/95 |
| 4,380,379 | A * | 4/1983 | Ahern | G02C 1/04 |
| | | | | 351/109 |
| 4,432,616 | A * | 2/1984 | Kurosaka | G02C 1/04 |
| | | | | 351/106 |
| 4,466,713 | A * | 8/1984 | Tanaka | G02C 1/04 |
| | | | | 351/86 |
| 4,834,523 | A * | 5/1989 | Porsche | G02C 5/006 |
| | | | | 351/149 |
| 5,325,132 | A * | 6/1994 | Mulrine | G02C 1/08 |
| | | | | 351/96 |
| 5,465,099 | A | 11/1995 | Mitsui et al. | |
| 5,917,575 | A | 6/1999 | Cunningham | |
| 5,980,037 | A | 11/1999 | Conway | |
| 6,010,216 | A * | 1/2000 | Jesiek | H04R 1/1058 |
| | | | | 351/158 |
| 6,163,926 | A * | 12/2000 | Watanabe | G02C 5/22 |
| | | | | 351/153 |
| 6,595,634 | B1 * | 7/2003 | Pilat, Jr. | G02C 1/08 |
| | | | | 351/103 |
| 6,986,576 | B2 * | 1/2006 | Smith | G02C 1/08 |
| | | | | 351/95 |
| 7,063,420 | B2 * | 6/2006 | Lerner | G02C 1/04 |
| | | | | 351/92 |
| 7,140,727 | B2 * | 11/2006 | Pilat, Jr. | G02C 5/008 |
| | | | | 351/103 |
| 7,249,843 | B2 * | 7/2007 | Lerner | G02C 5/008 |
| | | | | 351/86 |
| 7,537,337 | B2 * | 5/2009 | Lerner | G02C 1/08 |
| | | | | 351/92 |
| 8,485,659 | B2 * | 7/2013 | Xiao | G02C 1/08 |
| | | | | 351/149 |
| 8,736,500 | B1 | 5/2014 | Lam | |
| 8,979,259 | B2 * | 3/2015 | Haddock | G02C 5/2272 |
| | | | | 351/158 |
| 9,092,898 | B1 | 7/2015 | Fraccaroli et al. | |
| 9,482,882 | B1 | 11/2016 | Hanover et al. | |
| 9,482,883 | B1 | 11/2016 | Meisenholder | |
| 9,547,335 | B1 | 1/2017 | Bevelacqua et al. | |
| 9,726,904 | B1 | 8/2017 | Lin | |
| 10,877,293 | B1 * | 12/2020 | Ardisana | G02C 13/001 |
| 10,950,217 | B1 | 3/2021 | Dong et al. | |
| 11,063,338 | B2 * | 7/2021 | Hintermann | H01Q 9/28 |
| 11,415,818 | B2 * | 8/2022 | Olgun | H01Q 1/273 |
| 11,721,881 | B2 | 8/2023 | Hintermann et al. | |
| 12,255,379 | B2 | 3/2025 | Hintermann et al. | |
| 2004/0008146 | A1 | 1/2004 | Ikegaya et al. | |
| 2005/0007546 | A1 * | 1/2005 | Pilat, Jr. | G02C 1/08 |
| | | | | 351/154 |
| 2006/0164594 | A1 * | 7/2006 | Xiao | G02C 1/08 |
| | | | | 351/141 |
| 2008/0143620 | A1 | 6/2008 | Khatri | |
| 2009/0160717 | A1 | 6/2009 | Tsutsumi et al. | |
| 2010/0097280 | A1 | 4/2010 | Zirbes et al. | |
| 2011/0221656 | A1 | 9/2011 | Haddick et al. | |
| 2013/0070198 | A1 * | 3/2013 | Willey | G02C 7/101 |
| | | | | 351/158 |
| 2013/0293354 | A1 | 11/2013 | Vemagiri et al. | |
| 2014/0240474 | A1 | 8/2014 | Kondo | |
| 2015/0364822 | A1 | 12/2015 | O'driscoll | |
| 2015/0370088 | A1 | 12/2015 | Damin et al. | |
| 2016/0005233 | A1 | 1/2016 | Fraccaroli et al. | |
| 2016/0078278 | A1 | 3/2016 | Moore et al. | |
| 2016/0079660 | A1 | 3/2016 | Bevelacqua | |
| 2016/0204839 | A1 | 7/2016 | Liu et al. | |
| 2017/0110787 | A1 | 4/2017 | Ouyang et al. | |
| 2017/0187412 | A1 | 6/2017 | Han et al. | |
| 2019/0011699 | A1 | 1/2019 | Moore et al. | |
| 2019/0229395 | A1 | 7/2019 | Hintermann et al. | |
| 2019/0237856 | A1 | 8/2019 | Rautio | |
| 2020/0264455 | A1 * | 8/2020 | Olgun | G02C 11/10 |
| 2021/0399405 | A1 | 12/2021 | Hintermann et al. | |
| 2023/0369741 | A1 | 11/2023 | Hintermann et al. | |
| 2023/0411856 | A1 | 12/2023 | Zhu et al. | |
| 2025/0141086 | A1 | 5/2025 | Hintermann et al. | |

FOREIGN PATENT DOCUMENTS

| | | |
|---|---|---|
| CN | 102484320 | 5/2012 |
| CN | 102498617 | 6/2012 |
| CN | 102916244 | 2/2013 |
| CN | 103081224 | 5/2013 |
| CN | 103168390 A | 6/2013 |
| CN | 103858275 | 6/2014 |
| CN | 105449378 | 3/2016 |
| CN | 106486778 | 3/2017 |
| CN | 111656606 | 9/2020 |
| CN | 111656606 B | 11/2021 |
| CN | 113922045 A | 1/2022 |
| DE | 20103525 | 3/2003 |
| EP | 2768075 | 8/2014 |
| EP | 3714508 B1 | 7/2024 |
| JP | 2009152722 A | 7/2009 |
| JP | 2017192014 A | 10/2017 |
| KR | 101177344 | 8/2012 |
| KR | 102477903 B1 | 12/2022 |
| KR | 102664821 B1 | 5/2024 |
| TW | 1252608 B | 4/2006 |
| WO | 2011149364 | 12/2011 |
| WO | 2019147870 | 8/2019 |

OTHER PUBLICATIONS

"International Application Serial No. PCT/US2019/015034, Written Opinion mailed Jul. 18, 2019", 9 pgs.

"U.S. Appl. No. 16/257,011, Non Final Office Action mailed Apr. 15, 2020", 15 pgs.

"U.S. Appl. No. 16/257,011, Response filed Jul. 15, 2020 to Non Final Office Action mailed Apr. 15, 2020", 10 pgs.

"U.S. Appl. No. 16/257,011, Final Office Action mailed Aug. 7, 2020", 15 pgs.

"International Application Serial No. PCT/US2019/015034, International Preliminary Report on Patentability mailed Aug. 6, 2020", 11 pgs.

"U.S. Appl. No. 16/257,011, Response filed Oct. 7, 2020 to Final Office Action mailed Aug. 7, 2020", 10 pgs.

"U.S. Appl. No. 16/257,011, Advisory Action mailed Oct. 20, 2020", 3 pgs.

"U.S. Appl. No. 16/257,011, Notice of Allowance mailed Dec. 3, 2020", 9 pgs.

"European Application Serial No. 19721408.3, Response filed Jan. 18, 2021 to Communication pursuant to Rules 161(1) and 162 EPC mailed Jan. 18, 2021", 45 pgs.

"U.S. Appl. No. 16/257,011, Notice of Allowance mailed Mar. 12, 2021", 6 pgs.

"Chinese Application Serial No. 201980009822.7, Office Action mailed Jan. 27, 2021", w/ English Translation, 20 pgs.

"U.S. Appl. No. 16/256,681, Notice of Allowance mailed Aug. 31, 2020", 8 pgs.

"U.S. Appl. No. 17/351,704, Non Final Office Action mailed Dec. 8, 2022", 10 pgs.

"U.S. Appl. No. 17/351,704, Notice of Allowance mailed Mar. 20, 2023", 5 pgs.

"U.S. Appl. No. 17/351,704, Preliminary Amendment filed Oct. 25, 2021", 6 pgs.

"U.S. Appl. No. 17/351,704, Response filed Feb. 27, 2023 to Non Final Office Action mailed Dec. 8, 2022", 8 pgs.

(56) References Cited

OTHER PUBLICATIONS

"U.S. Appl. No. 18/197,576, Preliminary Amendment Filed Aug. 7, 2023", 6 pgs.

"Chinese Application Serial No. 201980009822.7, Response filed May 28, 2021 to Office Action mailed Jan. 27, 2021", w/ English claims, 16 pgs.

"European Application Serial No. 19721408.3, Communication Pursuant to Article 94(3) EPC mailed Oct. 13, 2022", 7 pgs.

"European Application Serial No. 19721408.3, Response filed Jan. 11, 2023 to Communication Pursuant to Article 94(3) EPC mailed Oct. 13, 2022", 39 pgs.

"Korean Application Serial No. 10-2020-7023867, Notice of Preliminary Rejection mailed Nov. 17, 2021", w/ English translation, 16 pgs.

"Korean Application Serial No. 10-2020-7023867, Response filed May 17, 2022 to Office Action mailed Nov. 17, 2021", w/ English Claims, 31 pgs.

"Korean Application Serial No. 10-2022-7043478, Notice of Preliminary Rejection mailed Aug. 3, 2023", w/ English Translation, 6 pgs.

"U.S. Appl. No. 18/197,576, Response filed Apr. 5, 2024 to Non Final Office Action mailed Jan. 5, 2024", 9 pgs.

"U.S. Appl. No. 18/197,576, Final Office Action mailed Jun. 17, 2024", 12 pgs.

"European Application Serial No. 24183777.2, Extended European Search Report mailed Sep. 23, 2024", 11 pgs.

"U.S. Appl. No. 18/197,576, Response filed Oct. 17, 2024 to Final Office Action mailed Jun. 17, 2024", 10 pgs.

"U.S. Appl. No. 18/197,576, Notice of Allowance mailed Nov. 5, 2024", 9 pgs.

"U.S. Appl. No. 18/197,576, Non Final Office Action mailed Jan. 5, 2024", 13 pgs.

"U.S. Appl. No. 18/197,576, 312 Amendment filed Feb. 3, 2025", 7 pgs.

"Chinese Application Serial No. 202111260022.8, Office Action mailed Dec. 9, 2024", W/English Translation, 13 pgs.

Hong, Seungman, et al., "Transparent and Flexible Antenna for Wearable Glasses Applications", IEEE Transactions on Antennas and Propagation, 64(7), (2016), 8 pgs.

"European Application Serial No. 24183777.2, Response filed Apr. 3, 2025 to Extended European Search Report mailed Sep. 23, 2024", 10 pgs.

"Chinese Application Serial No. 202111260022.8, Response filed Apr. 3, 2025 to Office Action mailed Dec. 9, 2024", w/ English Claims, 9 pgs.

\* cited by examiner

EYEWEAR DEVICE LENS RETENTION MECHANISM

PRIORITY

This application is a continuation of U.S. application Ser. No. 16/256,681, filed Jan. 24, 2019, which application claims the benefit of priority of U.S. Provisional Patent Application Ser. No. 62/621,482, filed on Jan. 24, 2018, which is hereby incorporated by reference herein in its entirety.

BACKGROUND

Electronics-enabled eyewear devices, such as smart glasses, have optical elements such as lenses held in view of the user by an eyewear frame. To allow for optional removal, repair, replacement, or changing of lenses, eyewear devices typically have retention mechanisms that are selectively lockable or unlockable by operation of a fastener such as a lock screw.

Such retention mechanisms often comprise a retainer element that extends peripherally around the lens, for example, comprising a retention ring. Some of the example embodiments disclosed herein provide for use of the retention element for electronics purposes, for example, relating to electromagnetic interference (EMI), electrostatic discharge (ESD), and/or signal transmission/reception considerations. Establishing an electronic connection between the retention element and onboard electronics of the eyewear device, while allowing for displacement of the retention element when the corresponding lens is to be removed or replaced is problematic owing to conflicting requirements for, on the one hand, selectively disengageable mechanical retention and, on the other hand, a reliable and consistent conductive connection.

BRIEF DESCRIPTION OF THE DRAWINGS

The appended drawings merely illustrate example embodiments of the present disclosure and cannot be considered as limiting its scope. To facilitate collation of numbered items in the description to the drawings, the first digit of each numbered item corresponds to the figure in which that item first appears. In the drawings.

The headings provided herein are merely for convenience and do not necessarily affect the scope or meaning of the terms used.

OVERVIEW

One aspect of the disclosure provides for a lens retention mechanism that establishes electrical contact between onboard electronics of an eyewear device and an elongated lens retainer (e.g., a retention ring) by a resiliently compressible electrical contact member (e.g., a spring washer) forming part of the lens retention mechanism.

In some embodiments, the lens retainer is conductively connected to the onboard electronics to serve as antenna element, the lens retention mechanism including an antenna launch that is conductively coupled to the onboard electronics and that is placed in electrical contact with the lens retainer by the electrical contact member, which is sandwiched in resilient compression between the lens retainer and the antenna launch. In some embodiments, the electrical contact is provided by a spring washer received on a lock screw that is screwingly engageable with a locking formation of the lens retainer.

The lens retention tension mechanism may further be configured and assembled within a housing defined by a body of the eyewear device such as to allow locking and unlocking of the lens retainer (e.g., to permit changing of lenses) while retaining the various components of the lens retention mechanism in a removal-resistant manner. In one such embodiment, a screw thread of the lock screw is located within the housing beyond a complementary screw-threaded opening, so that extraction of the lock screw from the housing is resisted by the screw-threaded opening. In an example embodiment, the screw-threaded opening that serves to capture the lock screw's screw-thread in the housing is defined by the antenna launch.

DETAILED DESCRIPTION

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

Figure 1:
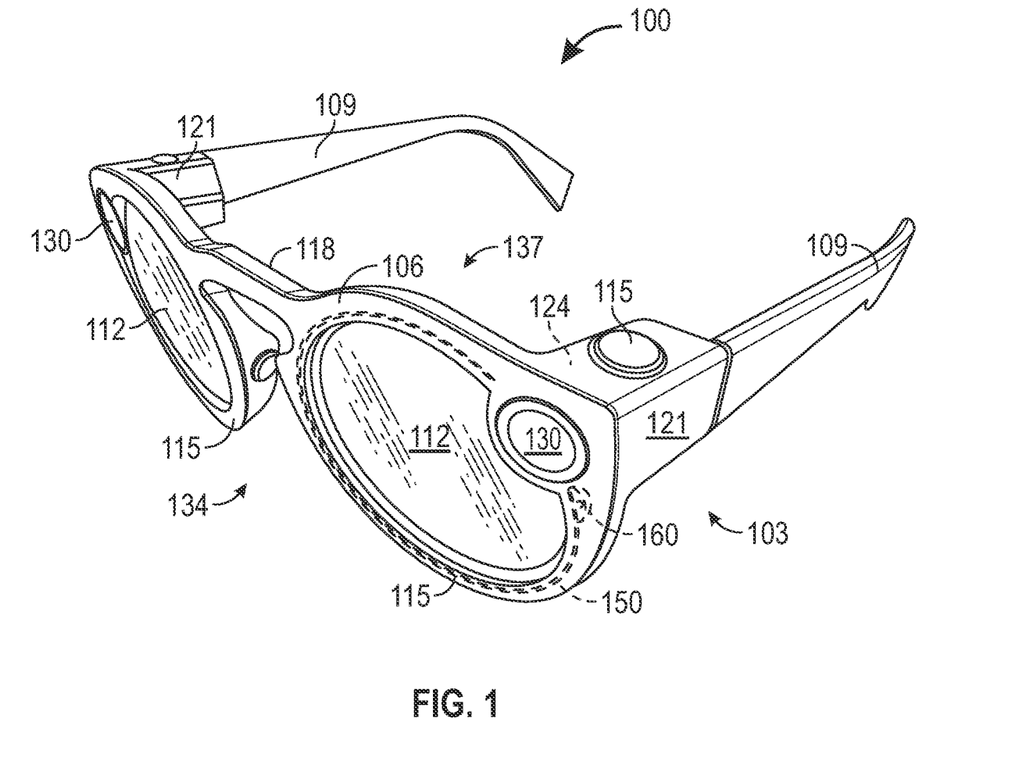
FIG. 1 is a schematic of a three-dimensional view of an electronics-enabled eyewear device in the form of a pair of smart glasses, according to an example embodiment.

FIG. 1 shows an oblique front view of an electronics-enabled eyewear device 100 in the example form of a pair of smart glasses. The eyewear device 100 includes a body 103 comprising a front piece or frame 106 and a pair of temples 109 connected to the frame 106 for supporting the frame 106 in position on a user's face when the eyewear device 100 is worn. The frame 106 can be made from any suitable material such as plastics or metal, including any suitable shape memory alloy.

The eyewear device 100 has a pair of optical elements in the form of a pair of optical lenses 112 held by corresponding optical element holders in the form of a pair of lens rims 115 forming part of the frame 106. The rims 115 are connected by a bridge 118. In other embodiments, of one or both of the optical elements can be a display, a display assembly, or a lens and display combination. The eyewear device 100 can, in such embodiments, provide a virtual reality headset or an augmented reality display. Description in this example embodiment of elements relating to lens retention is thus to be read as, in other embodiments, being analogously applicable to different forms of optical elements that can be removably and replaceably received in the lens rims 115 by operation of a retention mechanism analogous to that described herein.

The frame 106 includes a pair of end pieces 121 defining lateral end portions of the frame 106. In this example, a variety of electronics components are housed in one or both of the end pieces 121, as discussed in more detail below. In some embodiments, the frame 106 is formed of a single piece of material, so as to have a unitary or monolithic construction.

The temples 109 are coupled to the respective end pieces 121. In this example, the temples 109 are coupled to the frame 106 by respective hinges so as to be hingedly movable between a wearable mode (as shown in FIG. 1) and a collapsed mode in which the temples 109 are pivoted towards the frame 106 to lie substantially flat against it. In other embodiments, the temples 109 can be coupled to the frame 106 by any suitable means. Each of the temples 109 includes a front portion that is coupled to the frame 106 and a suitable rear portion for coupling to the ear of the user, such as the curved earpiece illustrated in the example embodiment of FIG. 1.

In this description, directional terms such as front, back, forwards, rearwards, outwards and inwards are to be understood with reference to a direction of view of a user when the eyewear device 100 is worn. Thus, the frame 106 has an outwardly directed front side 134 facing away from the user when worn, and an opposite inwardly directed rear side 137 side facing towards the user when the eyewear device 100 is worn. Similarly, the terms horizontal and vertical as used in this description with reference to different features of the eyewear device 100 are to be understood as corresponding to the orientation of the eyewear device 100 when it is level on the face of a user looking forwards. A horizontal or lateral direction of the eyewear device 100 thus extends more or less between the end pieces 121, while a vertical or upright direction of the eyewear device 100 extends transversely to the horizontal direction, such that the lenses 112 have a more or less vertical or upright orientation.

The eyewear device 100 has onboard electronics 124 including a computing device, such as a computer, which can, in different embodiments, be of any suitable type so as to be carried by the body 103. In some embodiments, various components comprising the onboard electronics 124 are at least partially housed in one or both of the temples 109. In the present embodiment, various components of the onboard electronics 124 are housed in the lateral end pieces 121 of the frame 106. The onboard electronics 124 includes one or more processors with memory, wireless communication circuitry, and a power source (this example embodiment being a rechargeable battery, e.g. a lithium-ion battery). The onboard electronics 124 comprises low-power, high-speed circuitry, and, in some embodiments, a display processor. Various embodiments may include these elements in different configurations or integrated together in different ways.

As mentioned, the onboard electronics 124 includes a rechargeable battery. In some embodiments, the battery is disposed in one of the temples 109. In this example embodiment, however, the battery is housed in one of the end pieces 121, being electrically coupled to the remainder of the onboard electronics 124.

The eyewear device 100 is camera-enabled, in this example comprising a camera 130 mounted in one of the end pieces 121 and facing forwards so as to be aligned more or less with the direction of view of a wearer of the eyewear device 100. The camera 130 is configured to capture digital still as well as digital video content. Operation of the camera 130 is controlled by a camera controller provided by the onboard electronics 124, image data representative of images or video captured by the camera 130 being temporarily stored on a memory forming part of the onboard electronics 124. In some embodiments, the eyewear device 100 can have a pair of cameras 130, e.g. housed by the respective end pieces 121. I The eyewear device 100 further includes one or more input and output devices permitting communication with and control of the camera 130. In particular, the eyewear device 100 includes one or more input mechanisms for enabling user control of one or more functions of the eyewear device 100. In this embodiment, the input mechanism comprises a button 115 mounted on the frame 106 so as to be accessible on top of one of the end pieces 121 for pressing by the user.

The eyewear device 100 is, in this example embodiment, configured for wireless communication with external electronic components or devices, to which end the onboard electronics 124 is connected to an antenna integrated in the body 103 of the eyewear device 100. In this example embodiment, the antenna is provided by a lens retainer in the example form of a lens ring 150 that additionally serves the purpose of removably and replaceably retaining the lens 112 in the corresponding lens rim 115. Note that, in FIG. 1, only one of the lens rims 115 is shown as having a corresponding lens ring 150 housed therein, but that both of the lens rims 115 is, in this example embodiment, provided with a respective lens ring 150 and associated lens retention mechanism, as described below.

In this example embodiment, the lens ring 150 is located in a circumferentially extending channel in a radially inner surface of the lens rim 115, so that the lens ring 150 extends circumferentially around the majority of the periphery of the lens 112, being engageable with the radially outer edge of the lens 112 to retain the lens 112 in the lens ring 150. The lens ring 150 is disposable between a retention condition, in which it is tightened into contact with the radial edge of the lens 112 to keep it in the lens rim 115, and a replacement condition in which the lens ring is somewhat dilated, to allow removal and replacement of the lens 112. In this embodiment, the lens ring 150 has a locking formation in the form of a lock tab 160 to lock the lens ring 150 in the retention condition by engagement with a lock screw forming part of a retention locking mechanism, as will be described in greater detail below. Thus, loosening of the lock screw allows circumferential movement of the corresponding end of the lens ring 150, to permit lens removal.

Figure 2:
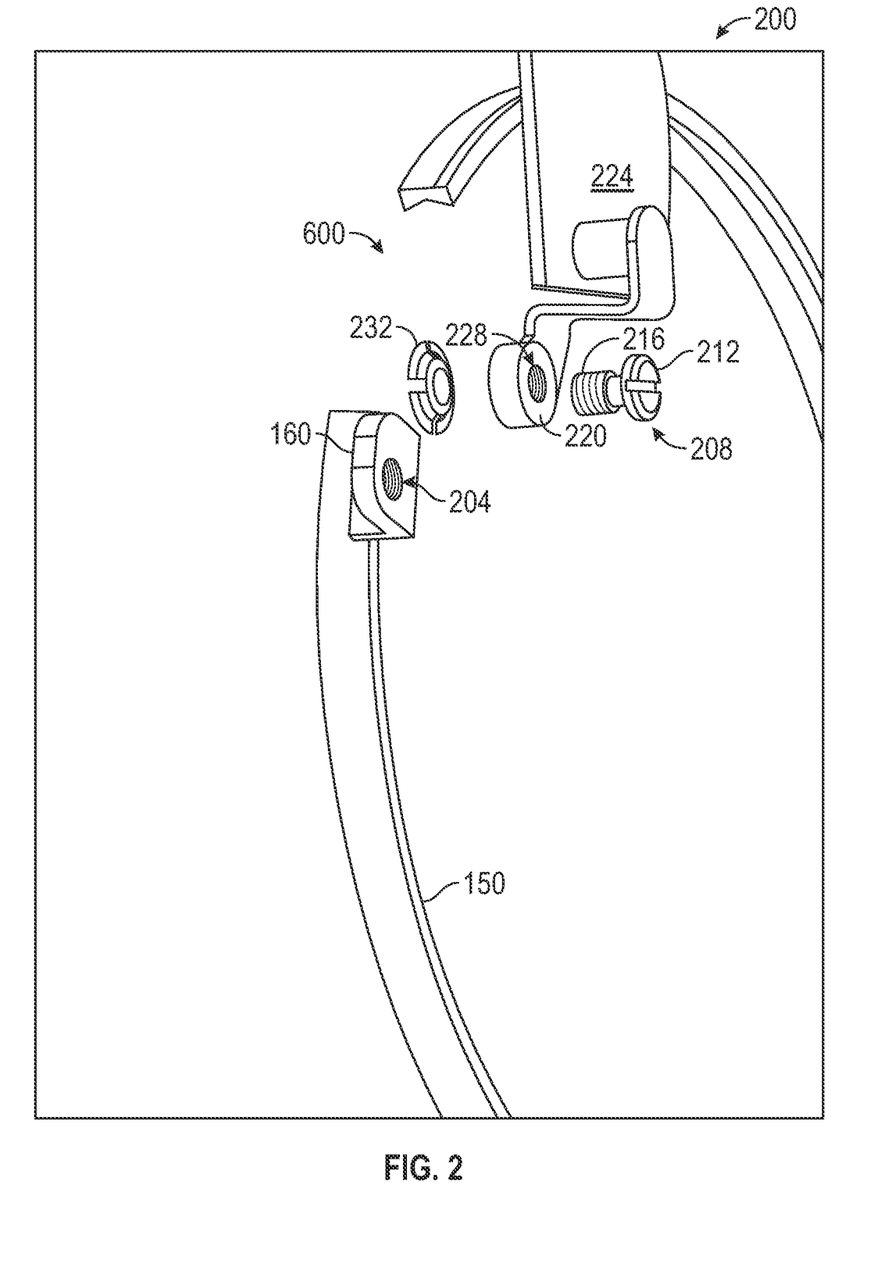
FIG. 2 is a three-dimensional exploded view of a lens retention assembly forming part of an eyewear device, according to one example embodiment.

FIG. 2 shows an exploded or disassembled view of a lens retention assembly 200, according to an example embodiment. The lens retention assembly 200, in this example embodiment, comprises a lens retainer in the example form of the lens ring 150 (as previously described), and a locking mechanism 600 for selectively locking and unlocking the lens ring 150, thereby disposing the lens ring 150 to the retention condition or the replacement condition, as the case may be. Operation of the locking mechanism 600 is described in greatest detail later below with reference to FIGS. 6A and 6B. As will emerge from the description that follows, the locking mechanism 600, in this example embodiment, serves the dual purposes of (a) selective locking/unlocking of the lens ring 150, and (b) establishing a reliable electrical connection between the lens ring 150 and the onboard electronics 124 of the eyewear device 100, to enable use of the lens ring 150 as an antenna element for sending and receiving electromagnetic signals.

Figure 3:
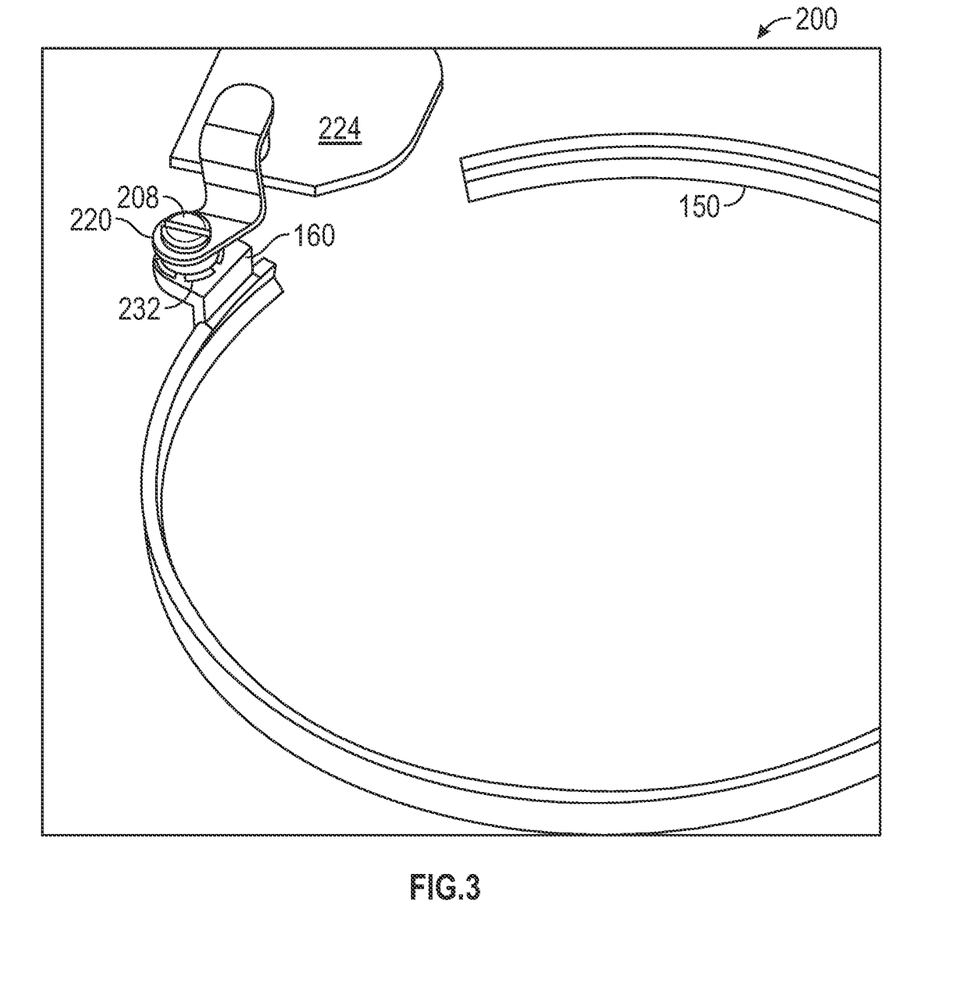
FIG. 3 is a three-dimensional view of the lens retention assembly according to the example embodiment of FIG. 3, the assembly for clarity of illustration being shown in an assembled form separate from a housing and lens rims forming part of the eyewear device.

Note that, to allow a clearer view of the various components of the lens retention assembly 200, a launch housing 404 (see FIG. 4) that contains a number of the components of the locking mechanism 600 is omitted in FIGS. 2 and 3. As will be seen more clearly with respect to the descriptions of FIGS. 4-6, the housing 404, is in this example embodiment provided by the body 103 of the eyewear device 100, forming part of a respective one of the end pieces 121.

Figure 6A:
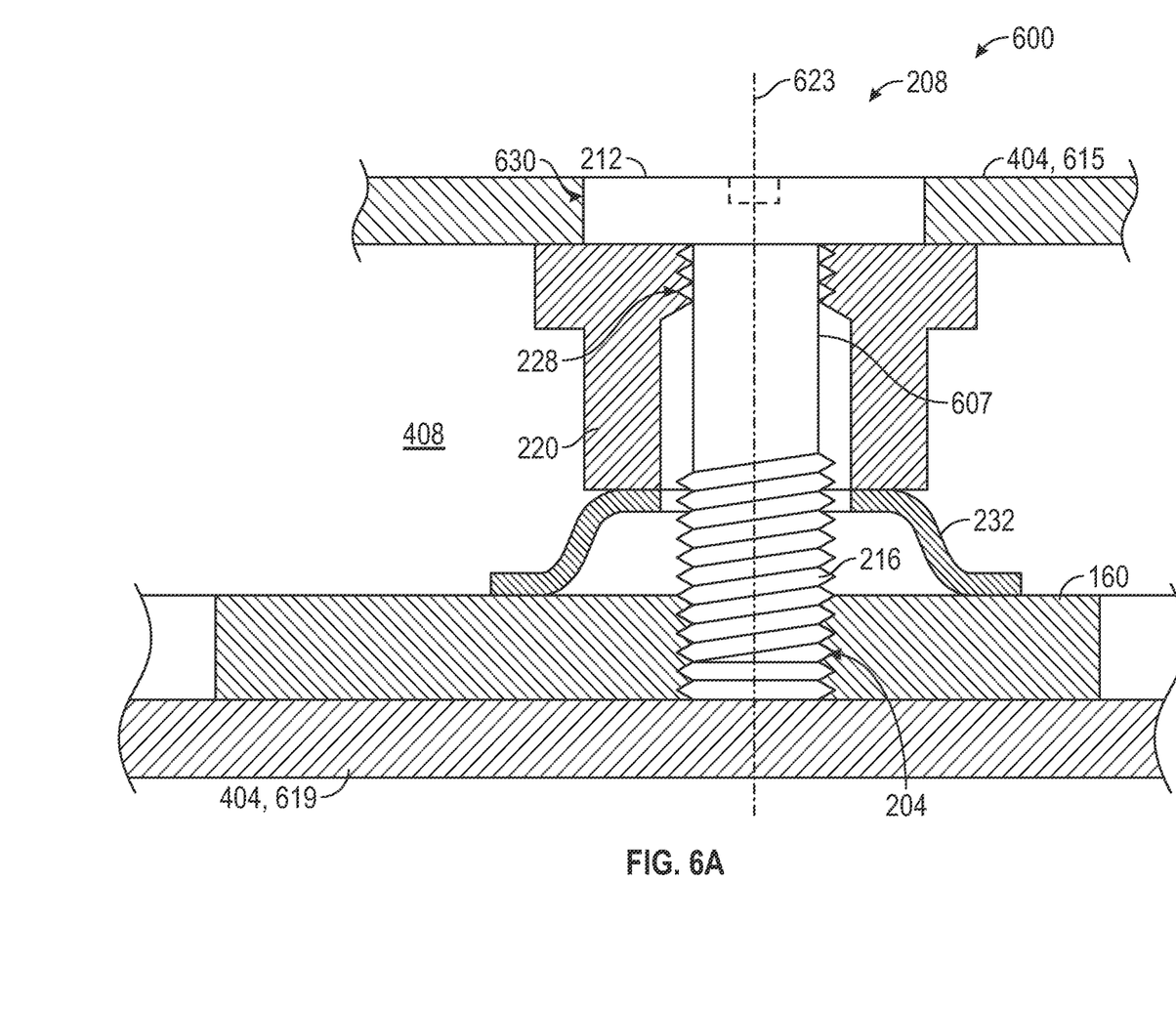
FIG. 6A is a schematic cross-sectional view of the retainer locking mechanism, according to an example embodiment of FIG. 2, the locking mechanism being in a locked position.

The locking mechanism 600, in this example embodiment, achieves locking of the lens ring 150 by engagement of a fastener in the form of a lock screw 208 with the lens ring 150. In particular, a screw thread 216 of the lock screw 208 is screwingly receivable in a complementary screw-threaded lock hole 204 defined in the lock tab 160 at a free end of the lens ring 150. As can be seen in FIG. 2, the orientation of the lock screw 208 and the lock hole 204 is, in this embodiment, such that a longitudinal axis (indicated in FIG. 6A as item 623) of the lock screw 208 is oriented in the fore-and-aft direction of the eyewear device 100. Turning briefly to FIG. 6A, it will be seen that screwing engagement of the lock screw 208 with the lock tab 160 serves to anchor the lock tab 160 relative to the frame 106 by location of a screw head 212 in a close-fitting complementary socket 630 in a rear wall 615 of the housing 404. In this position, the lock screw 208 and the lock tab 160 of the lens ring 150 are anchored against transverse movement relative to the housing 404 by engagement of the screw head 212 with the housing 404. In this description, unless otherwise indicated, the term axial refers to a direction substantially parallel to the longitudinal axis 623 of the lock screw 208. Similarly, the term transverse, in these contexts, refers to directions that are transverse to the screw axis 623.

Returning now to FIG. 2, it will be seen that the locking mechanism 600 further includes an electronics launch in the example form of an antenna launch 220 that it is conductively coupled to a printed circuit board (PCB) 224 forming part of the onboard electronics 124 of the eyewear device 100. The antenna launch 220 is a metal component of a material that can be selected for its electrical conductivity properties, in this example embodiment being a copper component. The antenna launch 220 is thus at one end thereof electrically connected to the PCB 224, at its other end defining a screw-threaded passage co-axial with and complementary to the screw thread 216 of the lock screw 208. During assembly, the screw thread 216 is screwed entirely through the passage 228 of the antenna launch 220 (see, for example, FIG. 6A), so that a smooth shank 607 of the screw head 212 is located co-axially in the screw-threaded passage 228, lock screw's screw thread 216 and screw head 212 being located axially on opposite sides of the passage 228. As will be described later, the screw-threaded passage 228 of the antenna launch 220 serves to hold the screw thread 216 captive in the housing 404 by resisting axial extraction of the lock screw 208 from the housing 404.

The lens retention assembly 200 further includes a resiliently compressible contact element in the form of a cup-shaped spring washer 232 co-axial with the lock screw 208 and axially sandwiched between the antenna launch 220 and the lock tab 160 of the lens ring 150. As can best be seen in FIG. 6A, the lock screw 208 extends axially through a central opening of the spring washer 232, thus holding the spring washer 232 captive against transverse escape. The spring washer 232 is in direct physical contact with both the lock tab 160 (bearing against a flat surface provided by the lock tab 160) and the antenna launch 220, thus providing a conductive path between the antenna launch 220 and the lock tab 160. It will be appreciated that the spring washer 232 in this manner electrically couples the lens ring 150 (via the lock tab 160) to the PCB 224 (via the antenna launch 220).

Moreover, in this example embodiment, electric coupling of the lens ring 150 to the PCB 224 via the spring washer 232 is promoted by selecting a relatively highly conductive metal for the spring washer 232. In this example embodiment, the spring washer 232 is of copper. It will be appreciated that the lock screw 208, being in physical contact with both the antenna launch 220 and the lock tab 160 also, to some extent, provides an electrical connection between these components. However, the lock screw 208 in this example embodiment has greater resistivity than the spring washer 232, being of mild steel as opposed to the copper pathway provided by the spring washer 232. Note that the lens retention assembly 200 is designed and configured such that the electrical connection between the PCB 224 and the lens ring 150 is fully operational purely via the spring washer 232, so that electrical coupling of the lens ring 150 to the PCB 224 is not dependent on the lock screw 208.

Figure 6B:
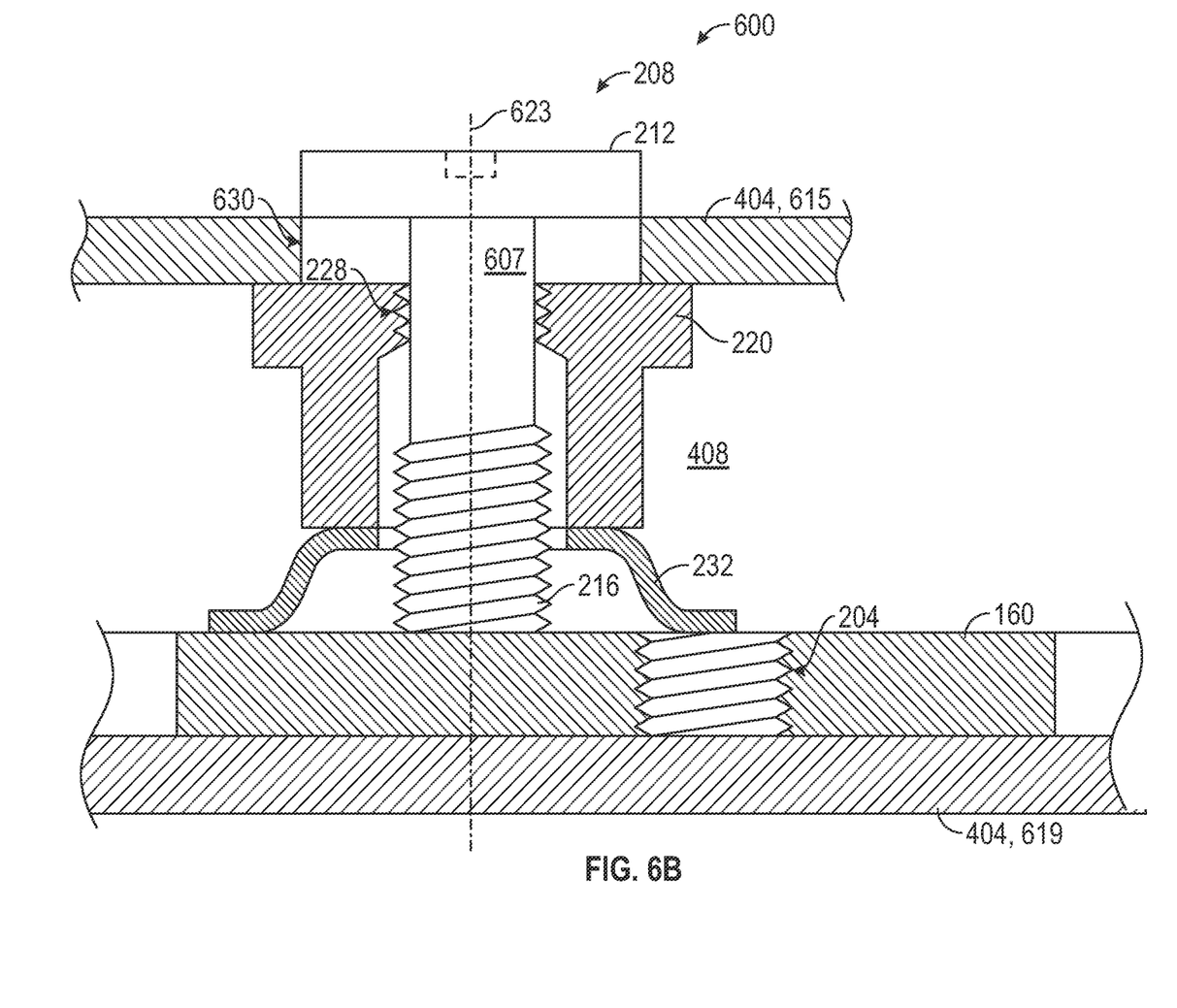
FIG. 6B is a view corresponding to FIG. 6A, the locking mechanism being in an unlocked position.

Consistent and effective conductive coupling of the spring washer 232 to both the antenna launch 220 and the lock tab 160 of the lens ring 150 is promoted in the example embodiment of FIG. 6A by virtue of the spring washer 232 by default being in a resiliently compressed state. Note that, in this example embodiment, the front wall 619 and the rear wall 615 of the launch housing 404 do not move relative to each other, so that an axial spacing between the rear wall 615 and the front wall 619 is substantially consistent. The axial length of the antenna launch 220 and the thickness of the lock tab 160 are likewise consistent, defining a substantially consistent axial spacing between them, in which the spring washer 232 is located. An unstressed axial height of the spring washer 232 is somewhat greater than the available space between the antenna launch 220 and the lock tab 160, so that the spring washer 232 is, in operation, axially compressed both in the locked position (FIG. 6A) and in the unlocked position (FIG. 6B). Due to his axial compression, the spring washer 232 resiliently biases the antenna launch 220 and the lock tab 160 in opposite axial directions, urging them apart. It will be appreciated that such enforced physical engagement of the spring washer 232 against the antenna launch 220 and the lock tab 160 ensures the provision of a consistent and uninterrupted conductive path.

Turning briefly to FIG. 3, therein is shown the lens retention assembly 200 in fully assembled form and in the retention condition in which lock screw 208 is in the locked position in which its screw thread 216 is received in the screw-threaded lock hole 204 of the lock tab 160. It will be noted (as can also be seen in FIGS. 6A and 6B) that the screw head 212 bears directly on the antenna launch 220, so that the additional tightening of the lock screw 208 can further compress the spring washer 232 by axially inward movement of the antenna launch 220. Note, however, that the length of the lock screw 208 and the height of the screw head 212 are selected such that movement of the screw head 212 fully through the rear wall 615 is not possible.

Figure 4A:
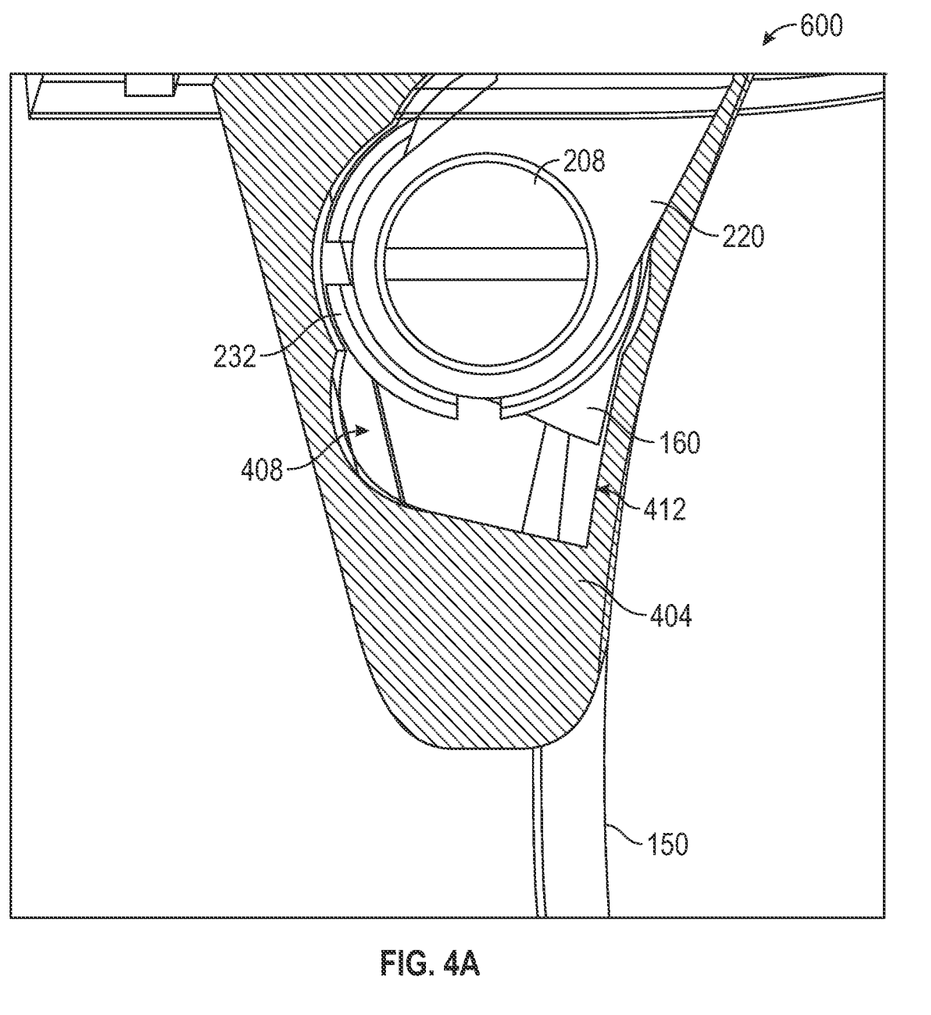
FIG. 4A is a schematic, partially sectioned rear view of a retainer locking mechanism forming part of a lens retention assembly, according to the example embodiment of FIG. 2, the locking mechanism being located within a launch housing provided by an eyewear frame, and being shown in FIG. 4A in a locked position.
Figure 4B:
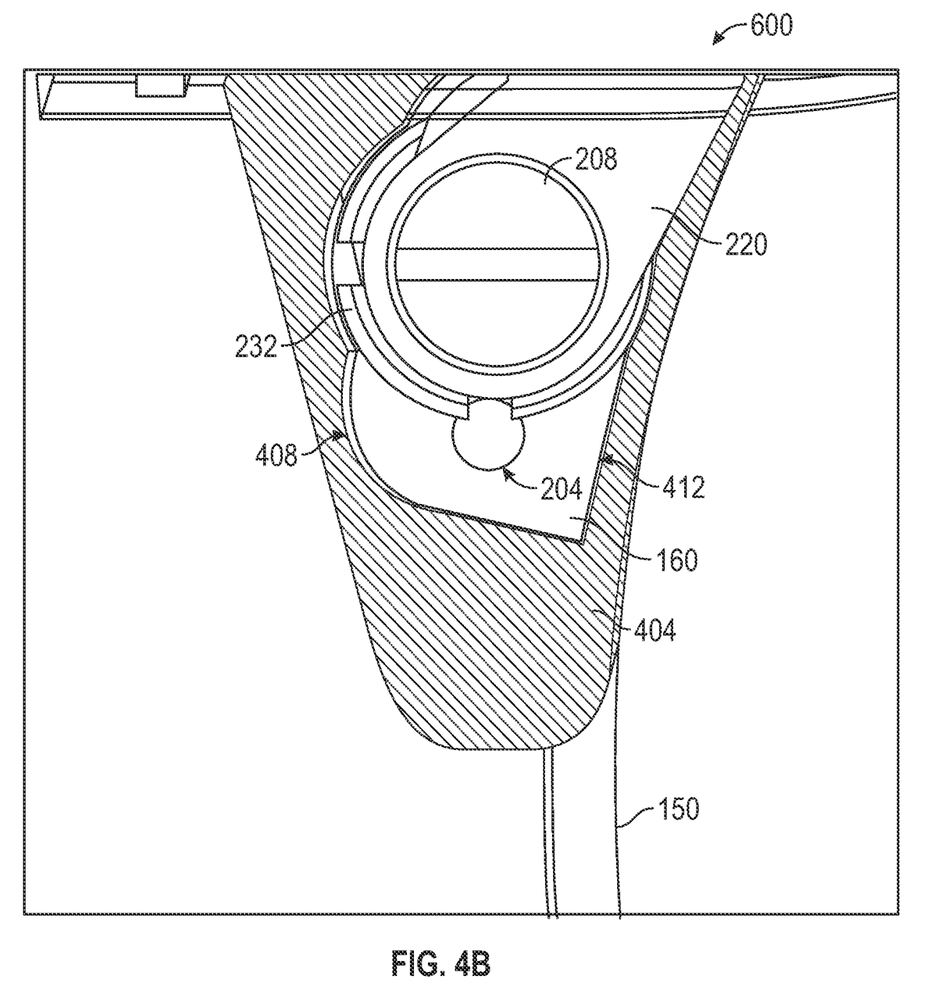
FIG. 4B is a view corresponding to FIG. 4A, the retention locking mechanism being shown in an unlocked position.

Turning now to FIGS. 4A and 4B, therein is shown a rear view of the locking mechanism 600 and launch housing 404 (i.e., seen from the rear side 137 of the eyewear device), with the rear wall 615 of the housing 404 being shown as removed to reveal the interior of the housing 404 and the components therein. The lock tab 160 is shown in FIG. 4A in the locked position and in FIG. 4B in the unlocked position.

The interior of the housing 404 defines a shaped housing cavity 408 that includes a channel 412 in which the lock tab 160 is slidable to move between the locked position (FIG. 4A) and the unlocked position (FIG. 4B). The shaped housing cavity 408 also defines a part circular space in which the spring washer 232 is held captive against transverse movement, preventing transverse sliding of the spring washer 232 into the sliding channel 412 for the lock tab 160. Note that the lens ring 150 is resiliently contractible, being biased, spring-fashion, to the position shown in FIG. 4B, in which the lock tab 160 stops against a side wall of the housing cavity 408.

Figure 5A:
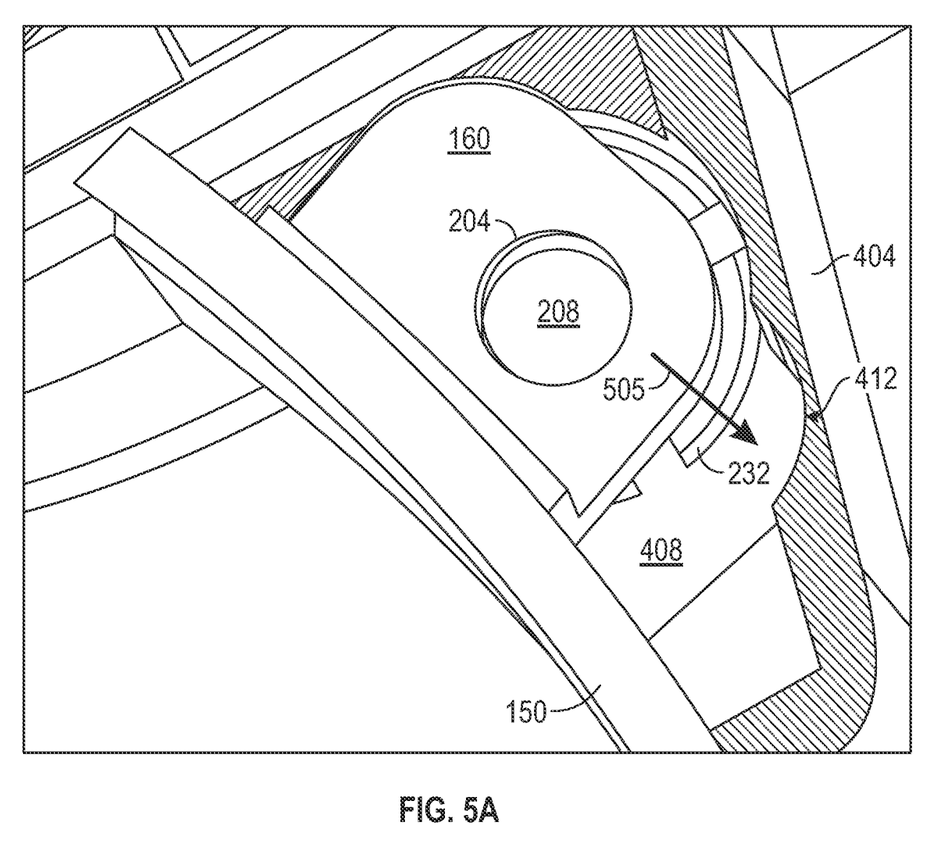
FIG. 5A is a partially sectioned front view of the retainer locking mechanism, according to an example embodiment of FIG. 4A, the locking mechanism being shown in the locked position.

FIG. 5A shows a front view of the locking mechanism 600 and the housing 404, with the front wall 619 being omitted for clarity of illustration. As can be seen in FIG. 5A, the lock tab 160 (when it is in the locked position) is held against transverse movement in the direction of arrow 505 my location of the lock screw 208 in the lock hole 204. When the lock screw 208 is screwed out of engagement with the lock hole 204 (see also FIG. 6B), the lens ring 150 resiliently expands, moving the lock tab 160 into its unlocked position shown in FIG. 5B. In this expanded position, the diameter of the lens ring 150 is somewhat greater than in the locked position (FIG. 5A), allowing removal and replacement of the lens 112. Note that when the lock tab 160 slides transversely into the unlocked position, the spring washer 232 remains in its original position (and does so even in the absence of the lock screw 208) due to the shaped periphery of the housing cavity 408.

In use, initial assembly of the locking mechanism 600 includes locating the spring washer 232, antenna launch 220, and lock tab 160 in the housing cavity 408, and thereafter screwing the screw thread 216 of the lock screw 208 through the screw-threaded passage 228 of the antenna launch 220. The lens ring 150 is then manually compressed or contracted, bringing the lock hole 204 of the lock tab 160 into register with the lock screw 208. Screwing the lock screw 208 into the lock hole 204 then places the locking mechanism 600 into the locked position, keeping the lens ring 150 in its retention condition (FIGS. 4A, 5A, and 6A).

Figure 5B:
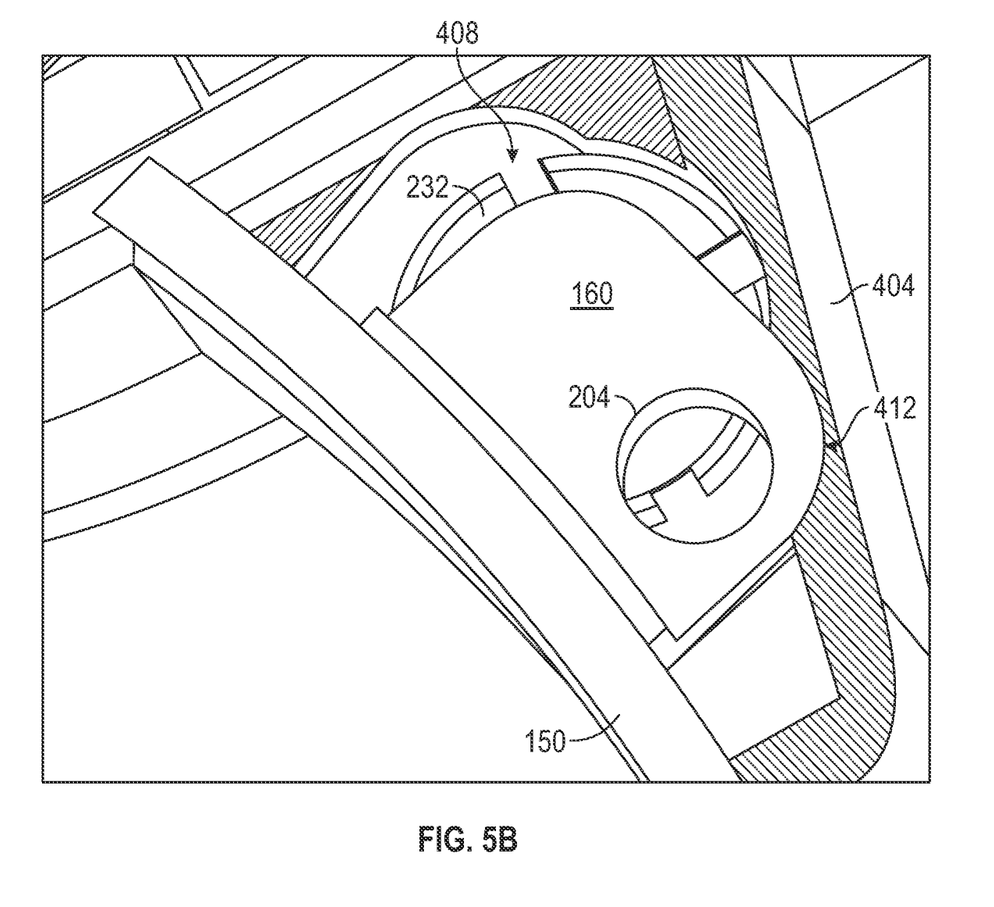
FIG. 5B is a view corresponding to FIG. 5A, the retainer locking mechanism being shown in an unlocked position.

When the lens 112 is to be removed the screw 208 is unscrewed, extracting its screw thread 216 axially from the lock hole 204. Responsive to the unscrewing, the lens ring 150 automatically expands into the unlocked position (FIGS. 4B, 5B, and 6B).

Note that in both the locked and unlocked position, the antenna launch 220 is electrically coupled to the lens ring 150 via the spring washer 232, allowing communication of electrical signals between the PCB 224 and the lens ring 150 for transmission and reception of electromagnetic signals by the lens ring 150 as an antenna.

A benefit of the example locking mechanism 600 is that all of its components are held captive within the housing 404, being resistant to user removal and/or tampering. In particular, simple axial extraction of the lock screw 208 is frustrated by fouling of its screw thread 216 against the screw thread of the passage 228 through the antenna launch 220. Thus, the lock screw 208 can be removed from the housing 404 only by screwing its screw thread 216 through the passage 228 of the antenna launch 220, which requires screwing engagement between the screw thread 216 and the passage 228. Such engagement, however, is frustrated by the difficulty of applying an axial load to the lock screw 208 in order to effect such screwing engagement. It will be remembered that the lock screw 208 is relatively small (considering, for example the scale of the eyewear device 100 as shown in FIG. 1), so that its weight is typically insufficient to reliably effect screwing engagement of the screw thread 216 with the passage 228.

In this example embodiment, the screw head 212 is substantially flush with the outer surface of the rear wall 615 of the housing 404 in the locked position (FIG. 6A), a substantially flush with the exterior surface of the rear wall 615, but stands proud of the rear wall 615 in the unlocked position (FIG. 6B). Due to the relatively small size of the lock screw 208 and the limited height of the screw head 212, gripping of the screw head 212 with a tool such as pair of pliers in order to pull the lock screw 208 axially outwards with sufficient force to cause initiation of screwing engagement with the antenna launch 220 is difficult, if not unfeasible. In other example embodiments, the dimensions of the relevant components are chosen such that the screw head 212 is flush or sub flush with the rear wall 615 in the unlocked position. In some such embodiments, the length of the screw thread 216 is selected such that, at an extreme extracted position of the lock screw 208 (at which position the screw thread 216 fouls on the screw thread of the launch passage 228), the screw head 212 is, in some embodiments, flush or sub flush or, in other embodiments, not fully displaced out of socket 630 defined therefor in the rear wall 615.

As will be evident from the description of the example embodiment above, this disclosure provides for a lens ring assembly that achieves electrical contact by use of a spring washer 232, allowing the lens ring 150 to be unscrewed and extended to permit the replacement of lenses 112 while retaining the relevant components (e.g., the lens ring 150, the lock screw 208, and the antenna launch 220) in a tamper-resistant manner that prevents or resists tampering, damage, or loss of individual components.

This is in contrast to existing lens retention assemblies, in which unscrewing of the lock screw 208 can be accompanied by intentional or accidental removal of the lock screw 208. Loss or misplacement of the lock screw 208 after such extraction is a common occurrence that leads to loss of functionality of the assembly.

A further benefit of the described example embodiments is that the electrical contact provided by the spring washer 232 is superior in quality and reliability to alternative mechanisms, such as provision of an electrical path provided by the lock screw 208. In such a mechanism, the quality of the connection is closely dependent on the particular torque or tension at which the lock screw 208 is fastened, which can require sophisticated and expensive tools for proper assembly and operation. In contrast, the electrically conductive path provided by the spring washer 232 is tolerant of (and may indeed be agnostic to) variations in the screw tension or applied torque.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. An eyewear device comprising:
   an eyewear frame;
   onboard electronics housed by the eyewear frame;
   an eyewear lens mounted on the eyewear frame;
   a lens retainer by which the eyewear lens is releasably retained on the eyewear frame, the lens retainer comprising a lens ring that extends circumferentially along a periphery of the eyewear lens, the lens ring being an electrically conductive component that is configured for co-operative connection to the onboard electronics and that is disposable between:
      a retention condition in which the lens ring engages a peripheral edge of the eyewear lens to prevent removal of the eyewear lens from the eyewear frame, and in which a releasable end of the lens ring is anchored against circumferential movement relative to the eyewear lens to effect dilation of the lens ring, and
      a replacement condition in which the lens ring is dilated relative to the retention condition, permitting removal and/or replacement of the eyewear lens, disposal of the lens ring from the retention condition to the replacement condition comprising circumferential movement of the releasable end of the lens ring relative to the eyewear lens to cause dilation of the lens ring; and
   a locking mechanism that provides a releasable physical coupling and a persistent electrical coupling with the lens ring, the locking mechanism comprising:
      a fastener configured for engagement with a complementary locking formation defined by the lens ring, the fastener being operable between:
         a locked condition in which the fastener is engaged with the locking formation of the lens ring such that the fastener anchors the releasable end of the lens ring circumferentially in a position in which the lens ring is in the retention condition, thereby releasably locking the lens ring in the retention condition, and
         an unlocked condition in which the fastener is free from the locking formation of the lens ring, permitting circumferential movement of the releasable end of the lens ring relative to the eyewear lens to allow disposal of the lens ring from the retention condition to the replacement condition; and
      a conductive contact element that is electrically connected to the onboard electronics and that is in engagement with the lens ring to complete a conductive path which provides an electrical connection between the onboard electronics and the lens ring; and
      a spring-loaded bias mechanism configured to resiliently urge the contact element towards contact engagement with the lens ring, thereby to maintain said electrical connection both when the lens ring is locked in the retention condition and when the lens ring is unlocked and is in the replacement condition.

2. The eyewear device of claim 1, wherein the fastener defines an axis along which the fastener is axially displaceable to dispose the fastener between the locked condition and the unlocked condition, wherein the contact element is resiliently compressible in the axial direction of the fastener, the contact element being axially sandwiched between, on the one hand, an electronics launch of the onboard electronics and, on the other hand, the locking formation of the lens ring, so that the contact element conductively bridges an axial spacing between the electronics launch and the locking formation of the lens ring, resilient action of the spring-loaded bias mechanism being caused by resilient resistance of the contact element to axial compression.

3. The eyewear device of claim 2, wherein the contact element defines an opening through which the fastener extends axially, such that the contact element is held captive by the fastener against transverse movement in the axial spacing.

4. The eyewear device of claim 3, wherein the contact element is a spring washer.

5. The eyewear device of claim 4, further comprising a capture mechanism configured to resist axial extraction of the fastener from the eyewear device when the fastener is in the unlocked condition.

6. The eyewear device of claim 5, wherein the fastener is a screw having a screw thread that, in the locked condition, is received in a complementary screw-threaded hole defined by the lens ring locking formation.

7. The eyewear device of claim 6, wherein the electronics launch is axially captured between the spring washer and a head of the screw that is accessible from an exterior of the eyewear frame, so that tightening of the screwing engagement with the lens ring locking formation urges the electronics launch towards the lens ring locking formation.

8. The eyewear device of claim 7, wherein the electronics launch has a screw-threaded opening complementary to the screw thread, the screw head and the screw thread of the screw being located on opposite axial sides of the electronics launch, so that axial extraction of the screw is resisted by the screw-threaded opening of the electronics launch.

9. The eyewear device of claim 6, wherein, in the unlocked condition, the locking formation is transversely slidable relative to the screw and the spring washer held captive thereby, allowing circumferential movement of the releasable end of the lens ring to dispose the lens ring to the replacement condition.

10. The eyewear device of claim 6, wherein a screw head of the screw is located in a complementary recess defined by an electronics launch housing forming part of the eyewear locking formation, such that an axially outer surface of the screw is sub-flush relative to an exterior surface of the electronics launch housing.

11. An eyewear device comprising:
an eyewear frame that comprises a lens holder configured to hold a lens;
a processor device housed by the eyewear frame and configured to provide one or more electronics-enabled functionalities to the eyewear device;
a metal retention ring housed by the lens holder and disposable between a retention condition in which it mechanically retains the lens in the lens holder, and a replacement condition in which removal or replacement of the lens is permitted;
a locking formation fixed to the retention ring;
an electrically conductive electronics launch element that is conductively coupled to the processor device;
an elongate fastener that passes axially through the electronics launch element and that is engageable with the locking formation to lock the retention ring in the retention condition; and
a spring washer that is received on the fastener and that is sandwiched between the retention ring locking formation and the electronics launch element, the spring washer being in a resiliently compressed state in which it bears against both the electronics launch element and the retention ring locking formation, thereby providing an electrically conductive connection between retention ring and the electronics launch element.

12. The eyewear device of claim 11, wherein the fastener is a lock screw that is screwingly engageable with the locking formation to lock the retention ring in the retention condition.

13. The eyewear device of claim 12, wherein at least part of the lock screw is held captive such as to resist axial extraction of the lock screw from the electronics launch element.

14. The eyewear device of claim 13, wherein the lock screw is held captive against axial extraction by a screw thread of a complementary screw-threaded opening through which the lock screw extends co-axially such that a screw thread of the screw and a head of the lock screw are located on axially opposite sides of the screw-threaded opening.

15. The eyewear device of claim 14, wherein the screw-threaded opening that holds captive the screw-threaded of the lock screw is provided by the electronics launch element.

* * * * *